(12) United States Patent
Doan et al.

(10) Patent No.: US 11,057,460 B2
(45) Date of Patent: Jul. 6, 2021

(54) WEIGHTED LOAD BALANCING METHOD ON DATA ACCESS NODES

(71) Applicant: VIETTEL GROUP, Ha Noi (VN)

(72) Inventors: Phi Hung Doan, Ha Noi (VN); Hoang Duong Do, Ha Noi (VN); Tien Dong Nguyen, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 0 days.

(21) Appl. No.: 17/087,535

(22) Filed: Nov. 2, 2020

(65) Prior Publication Data
US 2021/0168201 A1    Jun. 3, 2021

(30) Foreign Application Priority Data
Nov. 29, 2019   (VN) .............................. 1-2019-06742

(51) Int. Cl.
*H04L 29/08*   (2006.01)

(52) U.S. Cl.
CPC ...... *H04L 67/1023* (2013.01); *H04L 67/1031* (2013.01); *H04L 67/1095* (2013.01)

(58) Field of Classification Search
CPC . G06F 16/182; G06F 16/2379; H04L 43/028; H04L 45/54; H04L 67/06; H04L 67/1097; H04L 67/1023; H04L 67/1031; H04L 67/1095

USPC .......................................................... 709/223
See application file for complete search history.

(56) References Cited

U.S. PATENT DOCUMENTS

| | | | |
|---|---|---|---|
| 9,329,937 B1 * | 5/2016 | Grant .................... | G06F 9/4881 |
| 2006/0143350 A1 * | 6/2006 | Miloushev ............ | G06F 9/5016 |
| | | | 710/242 |
| 2018/0004777 A1 * | 1/2018 | Bulkowski .............. | G06F 16/27 |
| 2019/0281113 A1 * | 9/2019 | Preston ................... | H04L 45/54 |

* cited by examiner

*Primary Examiner* — Tonia L Dollinger
*Assistant Examiner* — Jonathan A Sparks
(74) *Attorney, Agent, or Firm* — patenttm.us

(57) ABSTRACT

The weighted load balancing method on data access nodes ensures the ability to horizontally scale the data access system, the load handling capacity of the system is increased linearly according to the number of data access nodes. The proposed method includes the following steps: step 1: update the routing table, when adding, removing nodes or changing nodes' weight, move virtual nodes from node having decreased number of virtual nodes to node having increased number of virtual nodes; step 2: store old routing table on array $A_i$ and new routing table on array $A_2$; step 3: block access to records that need to be moved; step 4: copy records from old node to node; step 5: perform read/write access using data partitioning method with new routing table $A_2$; step 6: clean duplicated records.

4 Claims, 4 Drawing Sheets

WEIGHTED LOAD BALANCING METHOD ON DATA ACCESS NODES

TECHNICAL FIELD OF THE DISCLOSURE

This disclosure defines a new weighted load balancing method on data access nodes, ensuring the ability to scale system's volume horizontally and to balance the load when adding, removing data access nodes or changing nodes' hardware configuration.

TECHNICAL STATUS OF THE INVENTION

To ensure heavy load handling capability of large data access system, software developers have to solve data partitioning and load balancing problems. Furthermore, it is important to rebalance the data when adding, removing data access nodes or changing node's hardware configuration, without interrupting the system.

Currently, there are many database management systems implementing different approaches to data partitioning, for example: MySQL, MongoDB, Aerospike, etc. However, these systems do not differentiate the weights of data access nodes. These data access nodes must have similar hardware configuration in order to handle the same amount of traffic. Additionally, modification in one of the data access node's hardware configuration can unbalance the system.

The weighted load balancing method referred in this disclosure will ensure the ability to horizontally scale data access system's volume, linearly increasing system's throughput when adding new data access nodes. This method also supports customization on the weight of each data access node allowing them to have different hardware configuration.

TECHNICAL FUNDAMENTALS OF THE INVENTION

The goal of this weighted load balancing method is to address the core problem of large data access system, which is load balancing and rebalancing the data when adding, removing data access nodes or changing nodes' hardware configuration, minimizing the amount of data to be shifted between nodes.

In order to achieve this goal, the weighted load balancing method on data access nodes includes the following steps:

Step 1: update the routing table; when adding, removing nodes or changing nodes' weight, move virtual nodes from a node that has a decreased number of virtual nodes to a node that has an increased number of virtual nodes; for example, consider a system which has n virtual nodes and m nodes whose identifiers and weights in turn are $ID_1$, $ID_2$, $ID_3$, ..., $ID_m$ and $W_1$, $W_2$, $W_3$, ..., $W_m$.

When adding a node with identifier $ID_{m+1}$, the proportion of data needs to be shifted is $$W_{m+1} \div \sum_{k=1}^{m+1} (W_k).$$

When removing a node with identifier $ID_1$ having I∈[1, in], the proportion of data needs to be shifted is $$W_i \div \sum_{k=1}^{m} (W_k).$$

When replacing nodes' weight with new values $Q_1$, $Q_2$, $Q_3$, ..., $Q_m$, the proportion of data needs to be shifted is $$\sum_{k=1}^{m} |Q_k \div Q - W_k \div W| \div 2.$$

In which m is the total number of nodes before adding or removing; $W_{m+1}$ is the weight of added node; $W_i$ is the weight of removed node; Q is new total weight; W is old total weight; $Q_k$ is new weight of node $ID_k$; $W_k$ is old weight of node $ID_k$.

Step 2: store old routing table (before being updated) on array $A_1$ and new routing table (after being updated on step 1) on array $A_2$.

Step 3: block access to records that need to be moved to other node:

For read access with key K, perform hash function F(x) to calculate value I=F(K); read record corresponding to key K from node having identifier $A_1[I]$ then return result.

For write access with key K, perform hash function F(x) to calculate value I=F(K); if $A_1[I]=A_2[I]$, record corresponding to key K is not being moved, write record to node having identifier $A_1[I]$ then return success code; if $A_1[I] \neq A_2[I]$, record corresponding to key K is being moved, deny write access and return error code.

Step 4: copy records from old node to new node: for each key K, perform hash function F(x) to calculate value I=F(K); if $A_1[I] \neq A_2[I]$, copy record corresponding to key K from node having identifier $A_1[I]$ to node having identifier $A_2[I]$; if $A_1[I]=A_2[I]$, record corresponding to key K does not need to be moved.

Step 5: after copying all records that need to be moved, all read/write access is performed using new routing table $A_2$: for each read/write access with key K, perform hash function F(x) to calculate value I=F(K); record corresponding to key K is accessed on node having identifier $A_2[I]$.

Step 6: clean duplicated records: for each key K, perform hash function F(x) to calculate value I=F(K); if $A_1[I] \neq A_2[I]$, remove record corresponding to key K from node having identifier $A_1[I]$; if $A_1[I] \neq A_2[I]$, record corresponding to key K is not duplicated.

DETAILED DESCRIPTION OF THE INVENTION

The weighted load balancing method on data access nodes is composed of two methods: data partitioning method and load balancing method when adding, removing data access nodes or changing nodes' weight.

Some terms used in the following detailed description are defined as follows:

| Term | Definition |
| --- | --- |
| Node | A data access node in the data access system. |
| Virtual node | Each node is corresponding to multiple virtual nodes. Data is accessed to node via corresponding virtual nodes. |
| Weight | A non-negative real number corresponding to each node. Node that has bigger weight will have more virtual nodes. |
| Routing table | A fixed size array containing the list of virtual nodes. |
| Record | A data structure which is stored in data access node. |
| Key | Each record is corresponding to one key. Record is accessed via corresponding key. |
| Hash function | A function with input is key's value and output is a non-negative integer belonging to interval [0, n] n is a defined positive integer. |

The data partitioning method is used to determine the data access node of the record corresponding to a specific key. In the case of data being rebalanced when adding, removing nodes or changing nodes' weight, data is accessed using the load balancing method as will be mentioned later.

The data partitioning method uses a routing table which is an array A of n items, the value of each item is the identifier of a node. Item with value X is considered a virtual node of node with identifier X. The number of virtual nodes of a node is determined as:

$$C = n \times W_1 \div W_2$$

Where C is number of virtual nodes of the node; n is total number of virtual nodes; $W_1$ is the weight of the node; $W_2$ is the total weight of all nodes.

When accessing a record corresponding to a specific key K, perform hash function F(x) to calculate value I=F(K)∈[0, n−1].

The value of item A[I] is the identifier of the node which has the record corresponding to key K.

Figure 8:
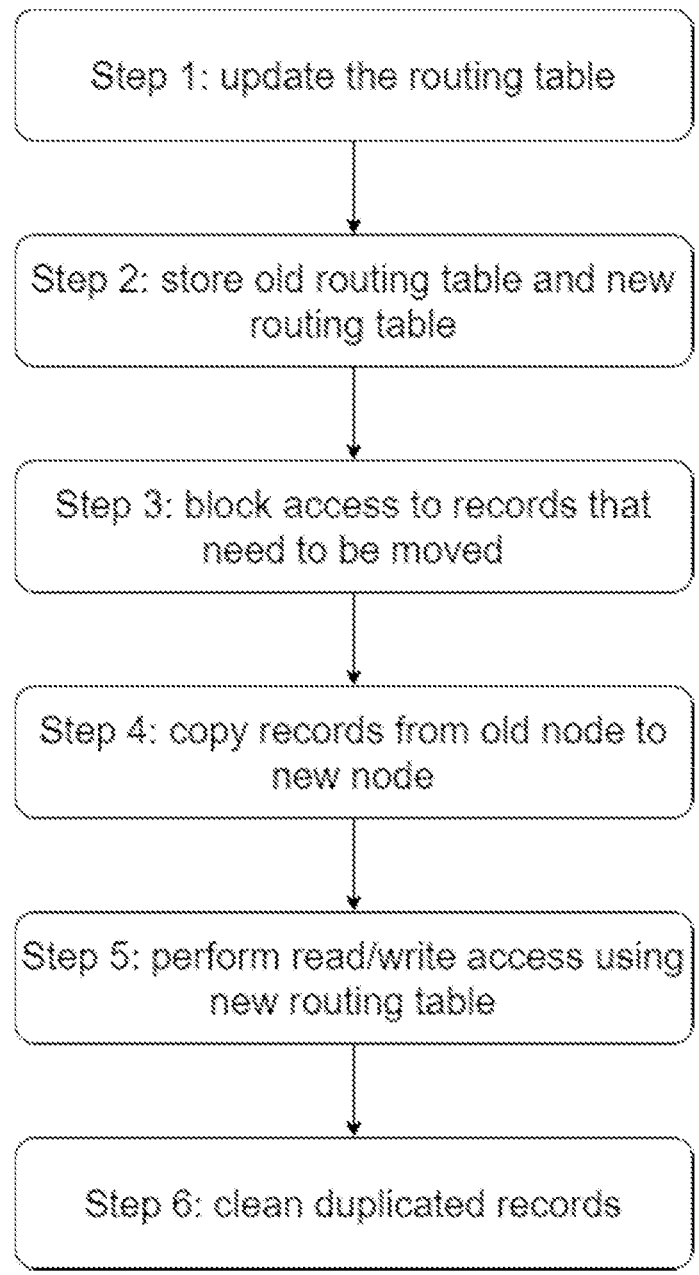
FIG. 8: illustrates an overview of the steps to implement the proposed method.

Refer to FIG. 8, the weighted load balancing method on data access nodes according to the proposed invention is performed sequentially as follows:

Step 1: update the routing table (move virtual nodes from a node to other nodes) when adding, removing nodes or changing nodes' weight.

Consider the system which consists of n virtual nodes and m nodes having identifiers and weights in turn are $ID_1$, $ID_2$, $ID_3$, . . . , $ID_m$ and $W_1$, $W_2$, $W_3$, . . . , $W_m$.

Figure 2:
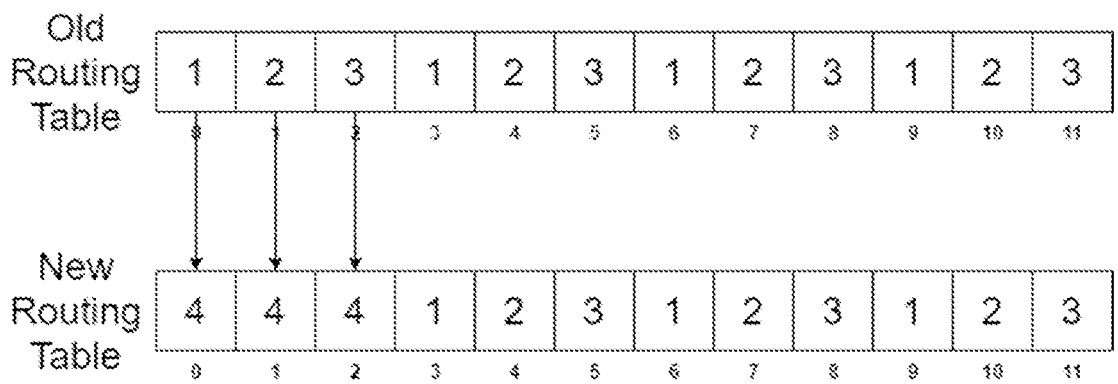
FIG. 2: illustrates the process of updating the routing table when adding a new node.

Refer to FIG. 2, when adding a new node with identifier $ID_{m+1}$, the proportion of data that needs to be shifted is:

$$W_{m+1} \div \sum_{k=1}^{m+1}(W_k)$$

Where m is total number of nodes before adding new node; $W_{m+1}$ is the weight of added node; $W_k$ is the weight of node $ID_k$.

For each node that has identifier $ID_i$ with I∈[1, m], odes from node $ID_i$ to node $ID_{m+1}$. The number of virtual nodes to be moved is:

$$n \times \left( W_i \div \sum_{k=1}^{m}(W_k) - W_i \div \sum_{k=1}^{m+1}(W_k) \right)$$

Where n is total number of virtual nodes; m is total number of nodes before adding new node; $W_i$ is the weight of added node; $W_k$ is the weight of node $ID_k$.

Figure 3:
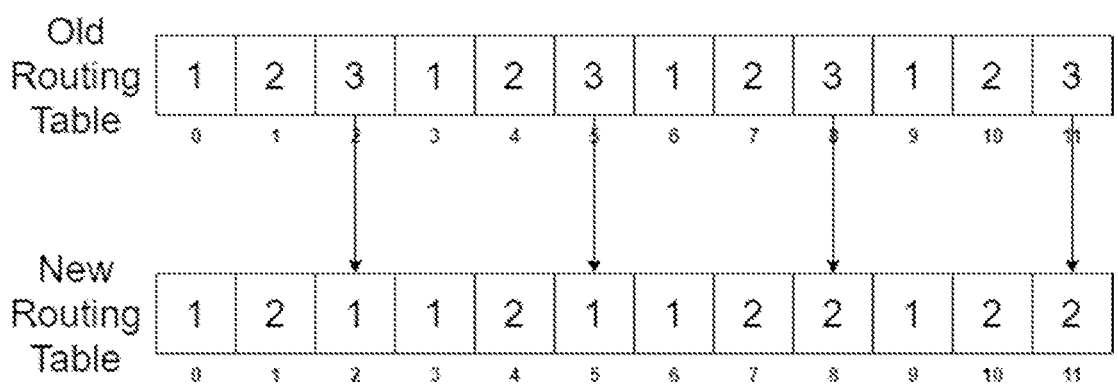
FIG. 3: illustrates the process of updating the routing table when removing a node.

Refer to FIG. 3, when removing a node with identifier $ID_i$ with I∈[1, m], the proportion of data that needs to be shifted is:

$$W_i \div \sum_{k=1}^{m}(W_k)$$

Where $W_i$ is the weight of removed node; $W_k$ is the weight of node $ID_k$.

For each node having identifier $ID_j$ with J∈[1, m] and J≠I, move virtual nodes from node $ID_i$ to node $ID_j$. The number of virtual nodes to be moved is:

$$n \times \left( W_j \div \left( \sum_{k=1}^{m}(W_k) - W_i \right) - W_j \div \sum_{k=1}^{m}(W_k) \right)$$

Where n is total number of virtual nodes; m is total number of nodes before removing node; $W_i$ the weight of removed node; $W_j$ is the weight of node $ID_j$; $W_k$ is the weight of node $ID_k$.

Figures 4, 5:
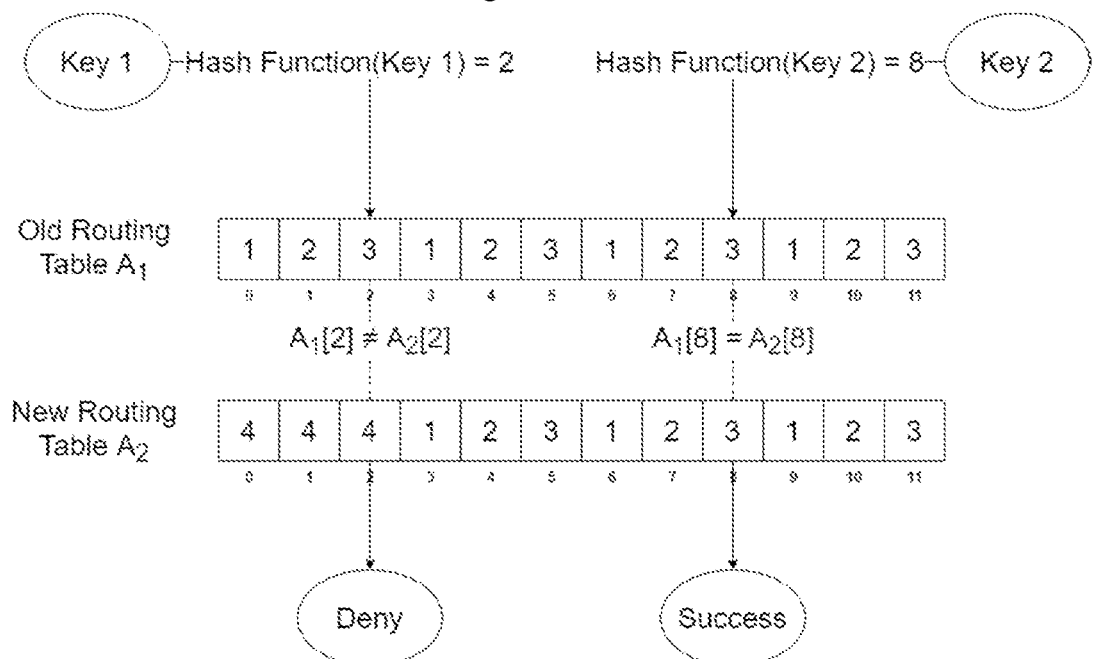
FIG. 4 illustrates the process of updating the routing table when changing nodes' weight.
FIG. 5: illustrates the process of write access after the routing table is updated.

Refer to FIG. 4, when changing the weight list of data access nodes to $Q_1, Q_2, Q_3, \ldots, Q_m$, the proportion of data that needs to be shifted is:

$$\sum_{k=1}^{m} |Q_k \div Q - W_k \div W| \div 2$$

Where Q is new total weight; W is old total weight; $Q_k$ is new weight of node $ID_k$; $W_k$ is old weight of node $ID_k$.

For each node having identifier $ID_i$ with I∈[1, m], the number of virtual nodes to be moved is:

$$C = n \times (Q_k \div Q - W_k \div W)$$

Where Q is new total weight; W is old total weight; $Q_k$ is new weight of node $ID_k$; $W_k$ old weight of node $ID_k$; C is the number of virtual nodes to be moved.

C=0: The number of virtual nodes does not change.
C>0: The number of virtual nodes increases.
C<0: The number of virtual nodes decreases.

Move virtual nodes from nodes having number of virtual nodes decreased to nodes having number of virtual nodes increased.

Step 2: Store old routing table (before being updated) on array $A_1$ and new routing table (after being updated on step 1) on array $A_2$.

Step 3: block access to records that needs to be moved to other node:

Refer to FIG. 5, the process of read/write access after updating the routing table is performed as follows:

For read access with key K:
Perform hash function F(x) to calculate value I=F(K).
Read record corresponding to key K on node $A_1[I]$ then return the result.

Figure 1:
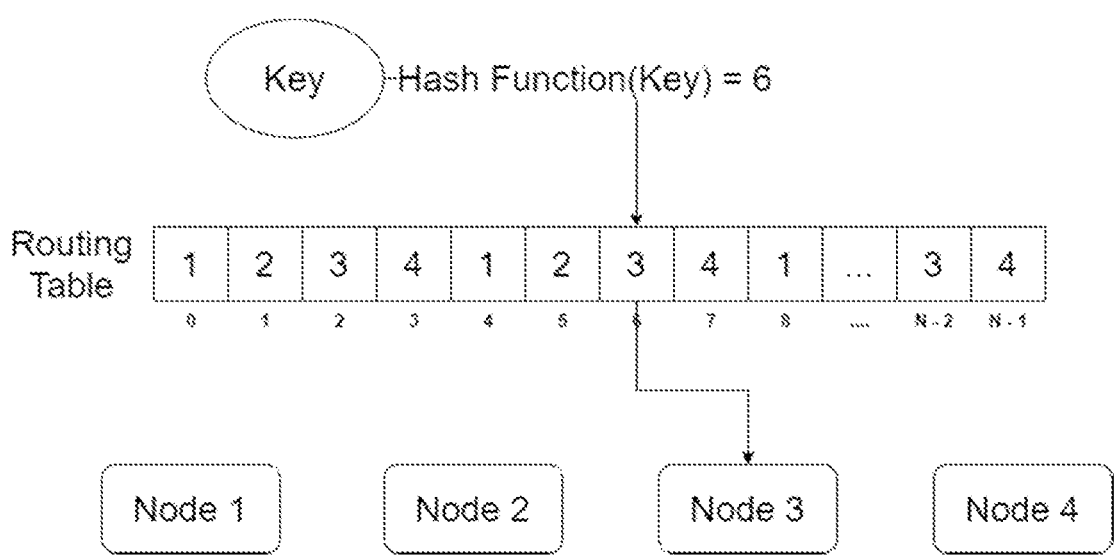
FIG. 1: illustrates the data partitioning method.
Figure 6:
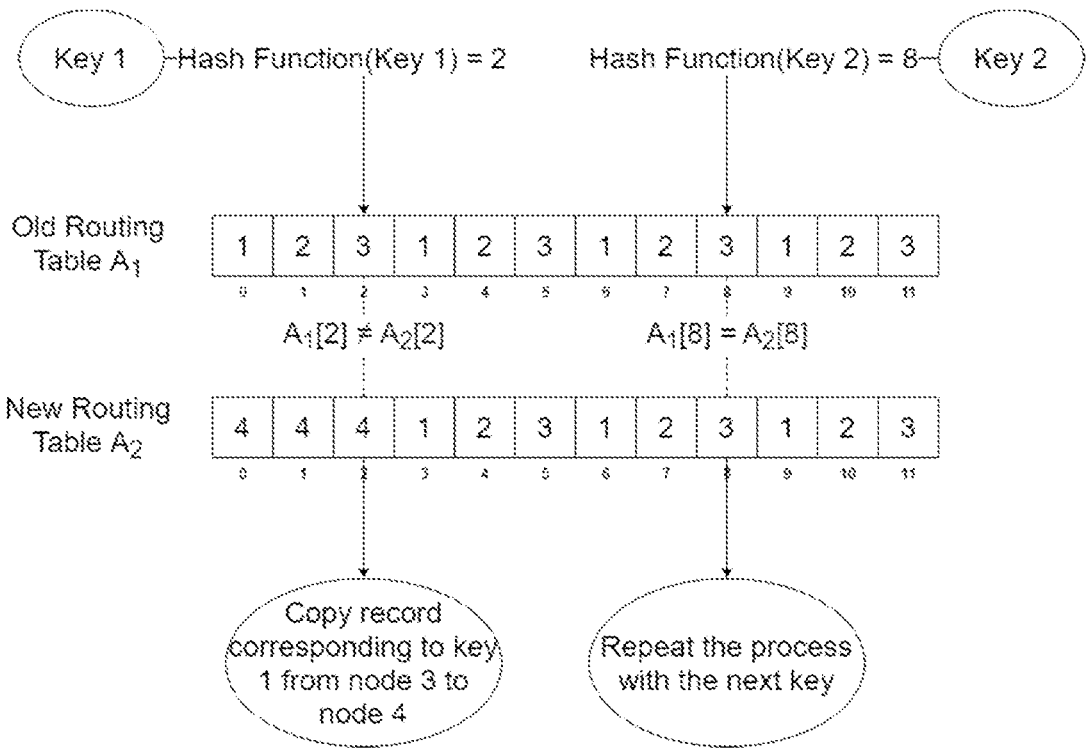
FIG. 6: illustrates the process of copying records to other node after the routing table is updated.
Figure 7:
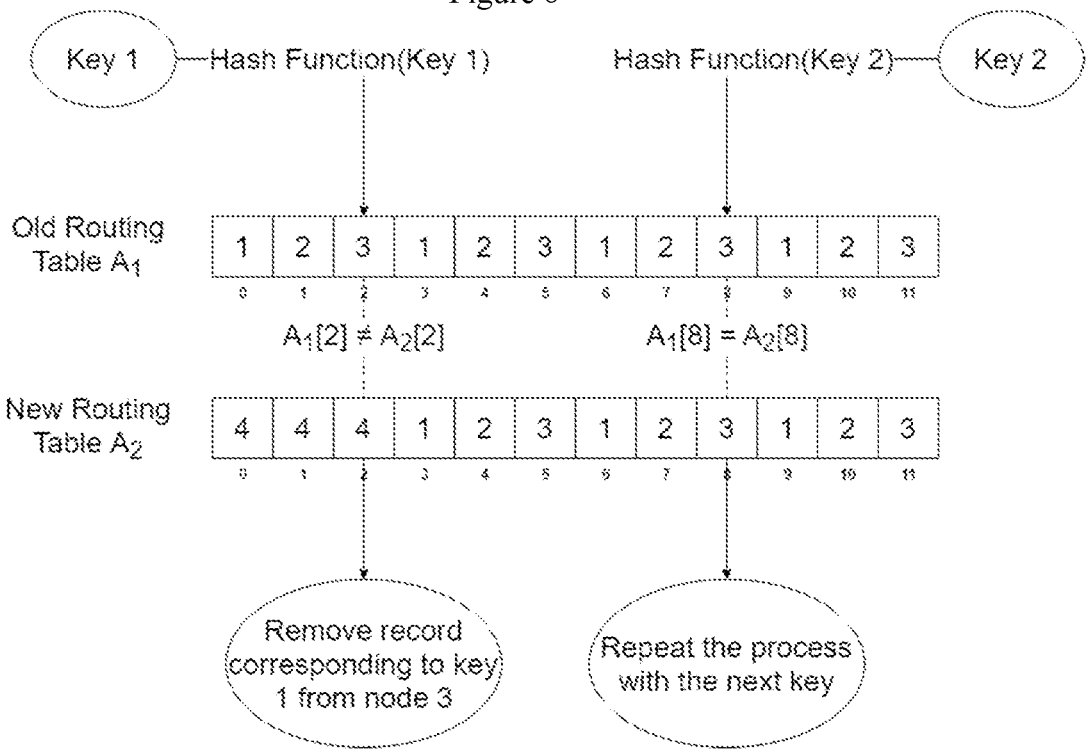
FIG. 7: illustrates the process of cleaning duplicated records after successfully copying records to other node.

For write access with key K:
Perform hash function F(x) to calculate value I=F(K).
If $A_1[I]=A_2[I]$, record corresponding to key K is not being moved, write record to node having identifier $A_1[I]$ then return success code.
If $A_1[I] \neq A_2[I]$, record corresponding to key K is being moved, deny write access and return error code.
Step 4: copy records from old node to new node:
Refer to FIG. 6, the process of copying records from old node to new node is performed as follows:
For each key K:
Perform hash function F(x) to calculate value I=F(K).
If $A_1[I] \neq A_2[I]$, copy the record corresponding to key K from node $A_1[I]$ to node $A_2[I]$,
If $A_1[I]=A_2[I]$, the record corresponding to key K does not need to be moved.
Step 5: after copying all records that need to be moved, all read/write access is performed using new routing table $A_2$.
Refer to FIG. 1, each read/write access with key K is performed as follows:
Perform hash function F(x) to calculate value I=F(K).
Record corresponding to key K is accessed on node $A_2[I]$.
Step 6: clean duplicated records:
Refer to FIG. 7, the process of cleaning duplicated records is performed as follows:
For each key K:
Perform hash function F(x) to calculate value I=F(K).
If $A_1[I] \neq A_2[I]$, remove record corresponding to key K from node $A_1[I]$.
If $A_1[I]=A_2[I]$, the record corresponding to key K is not duplicated.

Benefits of the Invention

Benefits of the invention include:
The data partitioning method: ensure the ability to horizontally scale the data access system, the load handling capacity is increased linearly according to the number of data access nodes.
The load balancing method when adding, removing data access nodes or changing nodes' weight: minimize the amount of data to be shifted, minimize service interruption and ensure data integrity during the migration.
Differentiate the weights of data access nodes, allowing data access nodes to have different hardware configuration.

What is claimed is:
1. The weighted load balancing method on data access nodes comprising the following steps:
Step 1: create a new routing table by updating an old routing table; when adding, removing nodes or changing a weight of nodes, move virtual nodes from a first node that has a decreased number of virtual nodes to a second node that has an increased number of virtual nodes; wherein a system which has n virtual nodes and m nodes whose identifiers and weights in turn are $ID_1$, $ID_2$, $ID_3$, ..., $ID_m$ and $W_1$, $W_2$, $W_3$, ..., $W_m$;
When adding a node with identifier $ID_{m+1}$, a proportion of data that needs to be shifted is

$$W_{m+1} \div \sum_{k=1}^{m+1} (W_k);$$

When removing a node with an identifier $ID_i$ having $I \in [1, m]$, the proportion of data needs to be shifted is $$W_i \div \sum_{k=1}^{m} (W_k);$$

When replacing the weight of nodes with new values $Q_1$, $Q_2$, $Q_3$, ..., $Q_m$, the proportion of data needs to be shifted is $$\sum_{k=1}^{m} |Q_k \div Q - W_k \div W| \div 2;$$

In which m is the total number of nodes before adding or removing; $W_{m+1}$ is the weight of the added node; $W_i$ is the weight of the removed node; Q is the new total weight; W is the old total weight; $Q_k$ is the new weight of node $ID_k$; $W_k$ is the old weight of node $ID_k$;
Step 2: store the old routing table (before being updated) on an array $A_1$ and the new routing table (after being updated on step 1) on an array $A_2$;
Step 3: block access to records that need to be moved to another node:
Wherein the block access to records comprises, for read access with key K, perform a hash function F(x) to calculate a value I=F(K); read a record corresponding to key K from the node having identifier $A_1[I]$ then return result;
For write access with key K, perform the hash function F(x) to calculate the value I=F(K); if $A_1[I]=A_2[I]$, the record corresponding to key K is not being moved, write record to the node having identifier $A_1[I]$ then return success code; if $A_1[I] \neq A_2[I]$, the record corresponding to key K is being moved, deny write access and return an error code;
Step 4: copy records from the old node to the new node: for each key K, perform the hash function F(x) to calculate value I=F(K); if $A_1[I] \neq A_2[I]$, copy the record corresponding to key K from the node having identifier $A_1[I]$ to the node having identifier $A_2[I]$; if $A_1[I]=A_2[I]$, the record corresponding to key K does not need to be moved;
Step 5: after copying all records that need to be moved, all read/write access is performed using the new routing table $A_2$: for each read/write access with key K, perform the hash function F(x) to calculate value I=F(K); the record corresponding to key K is accessed on node having identifier $A_2[I]$;
Step 6: clean duplicated records: for each key K, perform the hash function F(x) to calculate value I=F(K); if $A_1[I] \neq A_2[I]$, remove the record corresponding to key K from node having identifier $A_1[I]$; if $A_1[I]=A_2[I]$, the record corresponding to key K is not duplicated.
2. The weighted load balancing method on data access nodes according to claim 1, wherein the number of virtual nodes needing to be moved in the case of adding a new node having identifier $ID_{m+1}$ is $$n \times \left( W_i \div \sum_{k=1}^{m} (W_k) - W_i \div \sum_{k=1}^{m+1} (W_k) \right)$$

where n is total number of virtual nodes; m is total number of nodes before adding new node; $W_i$ is the weight of added node; $W_k$ is the weight of node $ID_k$.

3. The weighted load balancing method on data access nodes according to claim 1, wherein the number of virtual nodes needing to be moved in case of removing a node having identifier $ID_i$ with $I \in [1, m]$ is $$n \times \left( W_j \div \left( \sum_{k=1}^{m}(W_k) - W_i \right) W_j \div \sum_{k=1}^{m}(W_k) \right)$$

where n is total number of virtual nodes; m is total number of nodes before removing a node; $W_i$ is the weight of removed node; $W_j$ is the weight of node $ID_j$; $W_k$ is the weight of node $ID_k$.

4. The weighted load balancing method on data access nodes according to claim 1, wherein when replacing nodes' weight with new values $Q_1, Q_2, Q_3, \ldots, Q_m$, for each node having identifier $ID_i$ with $I \in [1, m]$, the number of virtual nodes to be moved is $C = n \times (Q_k \div Q - W_k \div W)$ where Q is new total weight; W is old total weight; $Q_k$ is new weight of node $ID_k$; $W_k$ is old weight of node $ID_k$; C is number of virtual node to be moved.

\* \* \* \* \*